United States Patent [19]

Chaur-Sheng

[11] Patent Number: 4,729,701

[45] Date of Patent: Mar. 8, 1988

[54] AUTOMATIC TOOL-REPLACING DEVICE MOUNTED ON MILLING MACHINE

[76] Inventor: Hwang Chaur-Sheng, No. 62, Fong-Jou Road, Shern-Gang Hsiang, Taichung Hsien, Taiwan

[21] Appl. No.: 947,353

[22] Filed: Dec. 29, 1986

[51] Int. Cl.[4] ............................................. B23C 5/26
[52] U.S. Cl. ............................................. 409/233
[58] Field of Search .................. 409/231, 233; 29/568

[56] References Cited

U.S. PATENT DOCUMENTS

| | | | |
|---|---|---|---|
| 2,667,820 | 2/1954 | DeVlieg | 409/233 |
| 3,038,386 | 6/1962 | Parske et al. | 409/233 |
| 3,262,369 | 7/1966 | Piotrowski | 409/233 |
| 3,753,383 | 8/1973 | Schmidt | 409/233 |
| 3,898,911 | 8/1975 | DeCaussin | 409/233 |
| 4,167,218 | 9/1979 | Horiuchi et al. | 409/233 |
| 4,413,938 | 11/1983 | Kuczenski | 409/233 |

*Primary Examiner*—Gil Weidenfeld
*Assistant Examiner*—Daniel W. Howell
*Attorney, Agent, or Firm*—Asian Pacific International Patent and Trademark Office

[57] ABSTRACT

It is a tool-replacing device to be mounted on a milling machine for automatically replacing a tool or locking a tool in place in a safe manner. The device mainly comprises a driving spindle, a motor, a reducing gear train, a transmission shaft, a sliding transmission cylinder, a spring, an attraction cylinder, and a solenoid, for actuation of a reach rod, and an electrical control case.

1 Claim, 6 Drawing Figures

AUTOMATIC TOOL-REPLACING DEVICE MOUNTED ON MILLING MACHINE

BACKGROUND OF THE INVENTION

The milling machine is one of the machine tools to be used in a mechanical processing factory and the metal processing industry, and it usually uses a rotating cutter to cut metals in the milling operation. The milling machine is considered to be a multi-function machine with different kinds of cutters which are used for face milling, slot milling, hole milling or boring.

A specific cutter has to be mounted on the machine for milling a different surface.

Referring to FIG. 6, it shows a prior art vertical type of tool-replacing implement and this implement generally, comprises a reach rod A, a driving spindle B, a tool post C and a cutter D, of which the assembling and disassembling procedures are as follows:

(1) Assembling: The cutter D is first mounted, on the tool post C, being locked with nut E; the reach rod A is screwed into the screw hole on the tool post C; the key hole on the cutter D is aligned with the key F under the driving spindle B. Then, screw the nut G tightly on the top of the reach rod A with an adjustable wrench. As soon as the power supply switch is turned on, the milling operation will start. Since the screwed direction between the cutter D and the reach rod A is the same as the rotation direction of the cutter D, the cutter will have a better support and fixing means.

(2) Disassembling: To replace a cutter D, turn off the switch first, and unscrew the reach rod A with an adjustable wrench. When the reach rod A has been unscrewed and loosened, the driving spindle B and the tool post C still maintain some clamping force; therefore, knock the top portion of the reach rod A so as to have the tool post C and the driving spindle B separated from each other in order to replace the cutter D.

Although the aforesaid method may be used to replace a tool, it still has some drawbacks, in the actual operation, as follows:

1. The reach rod A is positioned high above the driving spindle B. To replace a tool, a machine operator has to climb up and stand on the working table or the like; it would be rather inconvenient for him to climb up and down. Generally, several cutters (having different sizes or for different working requirements) have to be used for making one product; in that case, more time and manpower will be required or wasted.

2. The method of replacing a tool or cutter by knocking the reach rod A to eject the tool post C is susceptible to damage of the reach rod A, and to damage of the cutter, which might be fallen down upon knocking the reach rod with one hand, while the other hand tries to hold the cutter.

3. It is rather difficult to have the cutter D and the key F of the driving spindle B exactly engaged together with the operator's hands. Since there is a larger gap between the reach rod A and the hole in the driving spindle, an eccentric rotation between the cutter D and the reach rod A might take place to jeopardize the cutting precision.

SUMMARY OF THE INVENTION

In view of the aforesaid drawbacks of the conventional method of replacing a tool or cutter, the inventor has developed an automatic tool-replacing device for a milling machine through many years of experiences in electrical engineering, studies, and tests.

The prime object of the present invention is to provide an automatic tool-replacing device for a milling machine; the solenoid in the device can attract an attraction cylinder to pull a slidable transmission cylinder downwards. The lower end of the slidable or sliding transmission cylinder is engaged together with the top of a reach rod. Upon the forward or reverse rotation of the motor for the device, the reach rod and the tool can be screwed and fastened together or separated from each other in a swift manner.

Another object of the present invention is to provide an automatic tool-replacing device for the milling machine. With the device, the tool can be mounted or dismounted by merely pushing the forward rotation button or the reverse rotation button so as to save time and manpower and to provide a safe operation.

DETAILED DESCRIPTION

Figure 1:
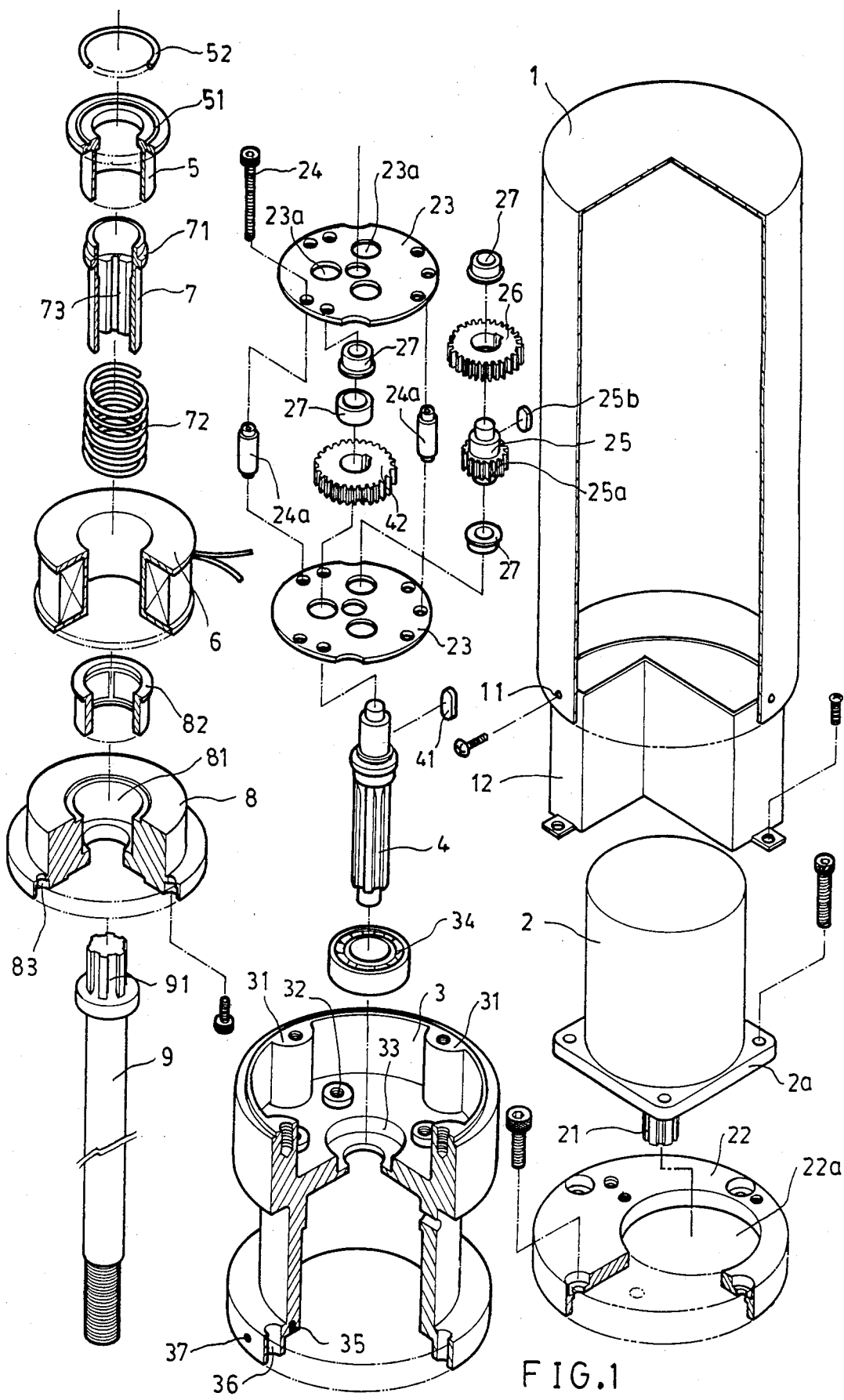
FIG. 1 is a disassembled view of an embodiment of the present invention.
Figure 2:
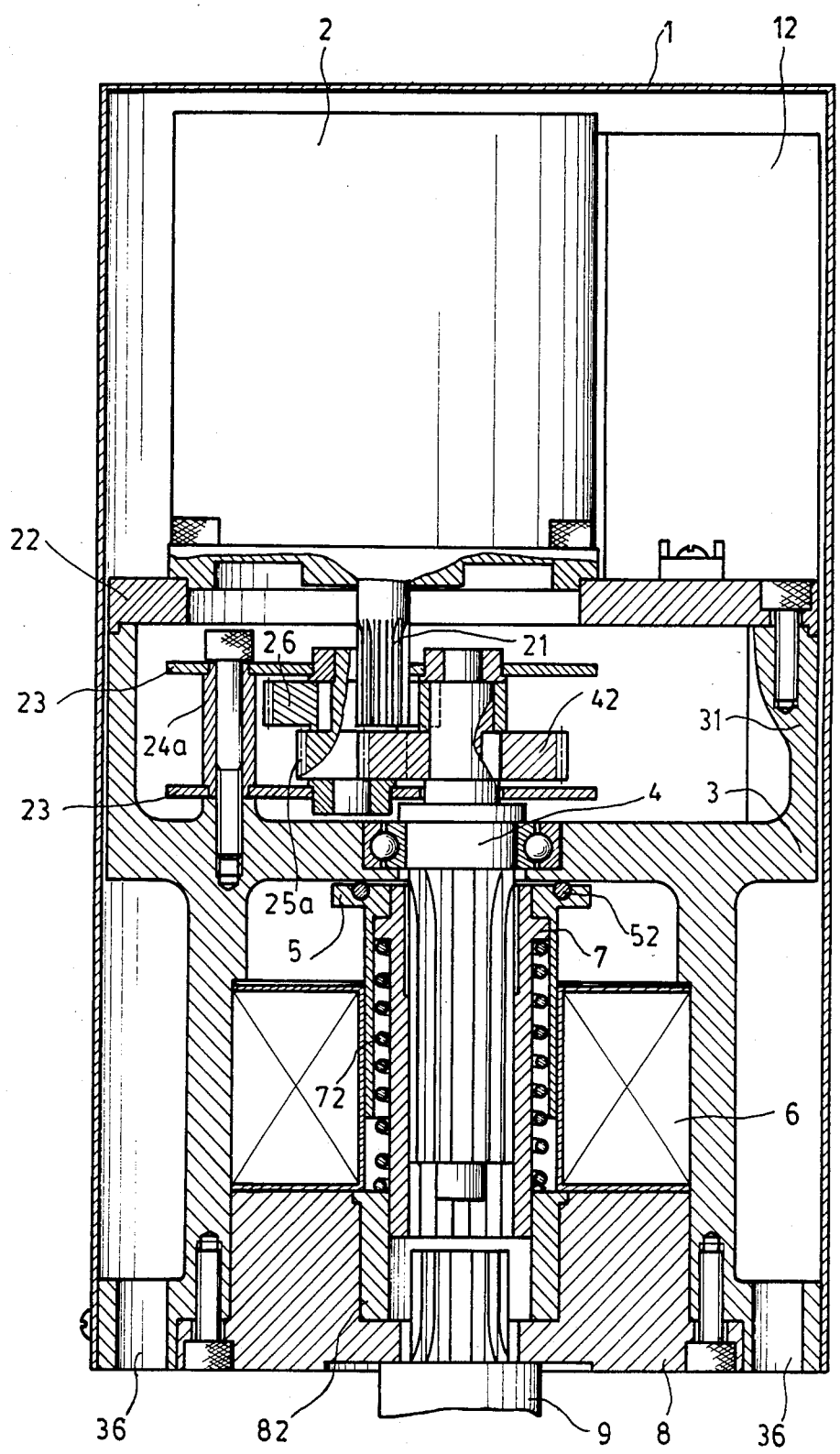
FIG. 2 is a sectional view of the present invention after being assembled.

Referring to FIGS. 1 and 2, they show the embodiment of the present invention, which mainly comprises a body portion 1, a motor 2, an upper base 3, a transmission shaft 4, an attraction cylinder 5, a solenoid 6, a sliding transmission cylinder 7, a base 8, and a reach rod 9.

The body portion 1 is substantially a hollow cylinder being mounted over the rest parts of the present invention; the base portion thereof is furnished with several screw holes 11 so as to fix together with the upper base 3.

The electrical control box 12 is to be fixedly mounted on the motor base 22; the shape of the box 12 can be coincided exactly with the square board 2a under the motor so as to be mounted together with the motor 2 on the motor base 22.

The motor 2 is mounted in the upper portion of the body portion 1. The motor 2 comprises a transmission shaft 21 and a motor base 22. The base 22 is fixed on the upper base 3 to provide the motor 2 with an eccentric position, and is used to fix the electrical control case 12 in position. The central through hole 22a is used to mount the transmission shaft 21 therein. Two mounting discs 23 are assembled with screws 24 and sleeves 24a, being fixed to the upper base 3. The two mounting discs 23 are spaced with the sleeves 24a. The discs 23 are furnished with several corresponding through holes 23a for mounting a gear shaft 25 and a transmission shaft 4. The gear shaft 25 has a small gear 25a and a large gear 26 to be mounted thereon with a key 25b. A large gear 42 is also mounted, with a key 41, on the transmission shaft 4. The gear 42 is to be engaged with the small gear 25a, while the transmission shaft 21 is engaged with another large gear 26. Several bearing bushings 27 are used to guide the gear shaft 25 and the transmission shaft 4 to rotate.

The upper inner surface of the upper base 3 is furnished with several screw hole posts 31 for mounting the motor base 22. Several screw holes 32 are furnished around the central fish-eye hole 33 for fixing the two mounting discs 23. A bearing 34 is mounted in the fish-eye hole 33 for guiding the transmission shaft 4 mounted therein. The bottom surface of the upper base 3 is furnished with screw holes 35 for receiving screws respectively so as to mount the upper base 3 and the base 38 together. The bottom flange of the upper base is furnished with holes 36 so as to facilitate the upper base 3 to be mounted on the milling machine (not shown); also, the bottom flange is furnished with screw holes 37 for securing it to the body portion 1.

The attraction cylinder 5 is a hollow cylinder, having two inner surfaces. The top is a plane surface with a circular groove 51 for mounting an O-shaped ring 52 therein. The O-shaped ring 52 is actually in contact with the bottom of the fish-eye hole 33 in the upper base 3 so as to minimize friction.

The sliding transmission cylinder 7 is furnished with a ring-shaped flange 71 on the upper portion thereof to contact, by means of spring 72, under the inner top portion of the attraction cylinder 5. The inner surface of the cylinder 7 with gear tooth groove 73 is adapted to engage the transmission shaft 4.

The solenoid 6 is mounted above the base 8; the attraction cylinder 5 is mounted in the center hole of the solenoid 6.

The base 8 has a through hole 81, in which a bushing 82 is mounted; the sliding transmission cylinder 7 is rotatably mounted in the bushing 82. The bottom surface of the base 8 is furnished with holes 83 so as to be fastened together with the upper base 3; the gear stud 91 on the top of the reach rod 9 is exactly mounted in the lower part of the through hole 81 of the base 8.

The reach rod 9 is furnished with a geared stud 91 to be engaged with the gear tooth groove 73, while the lower end of the reach rod 9 is furnished with screw threads.

Figure 3:
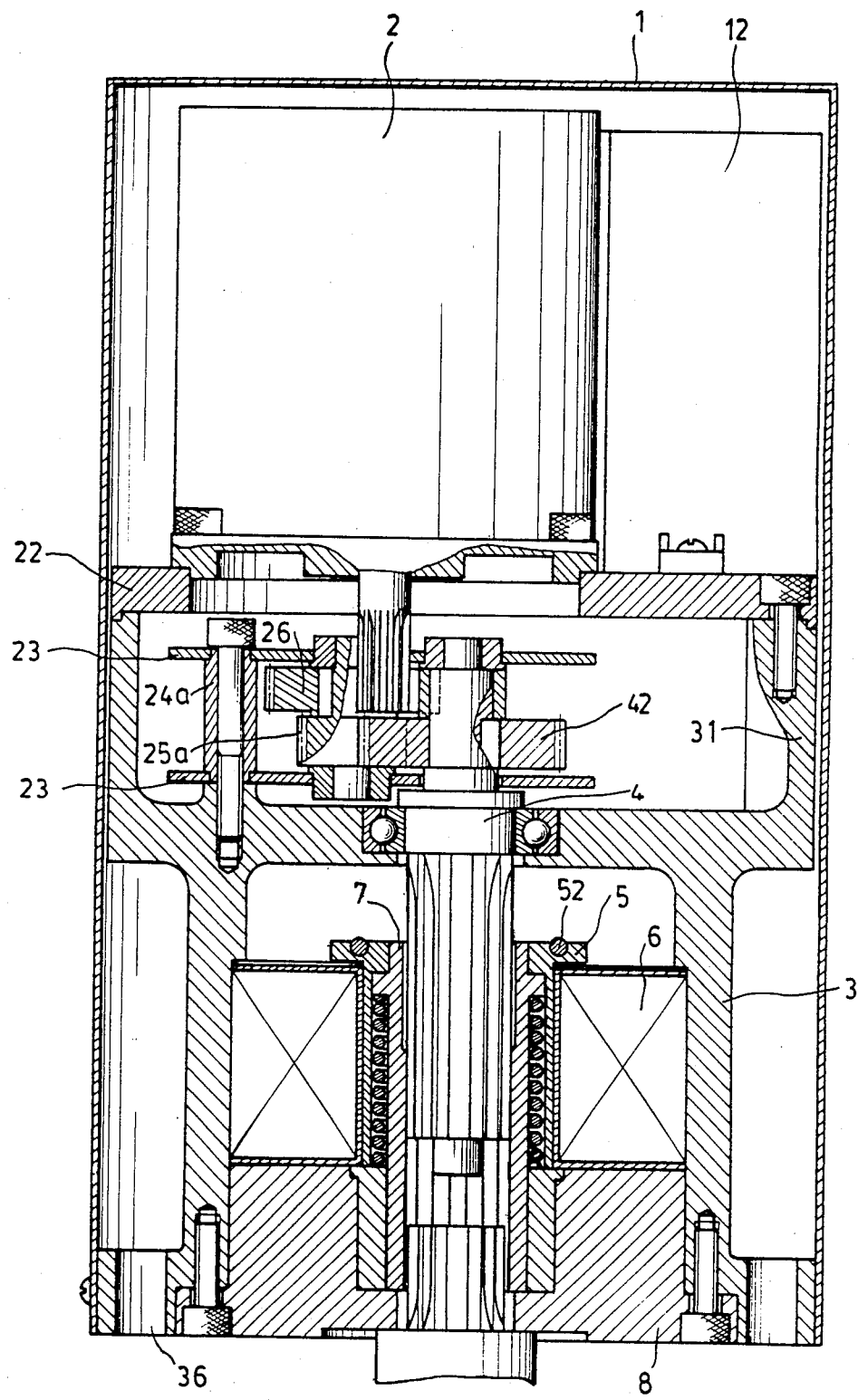
FIG. 3 is a sectional view of the present invention, being in operation.
Figure 4:
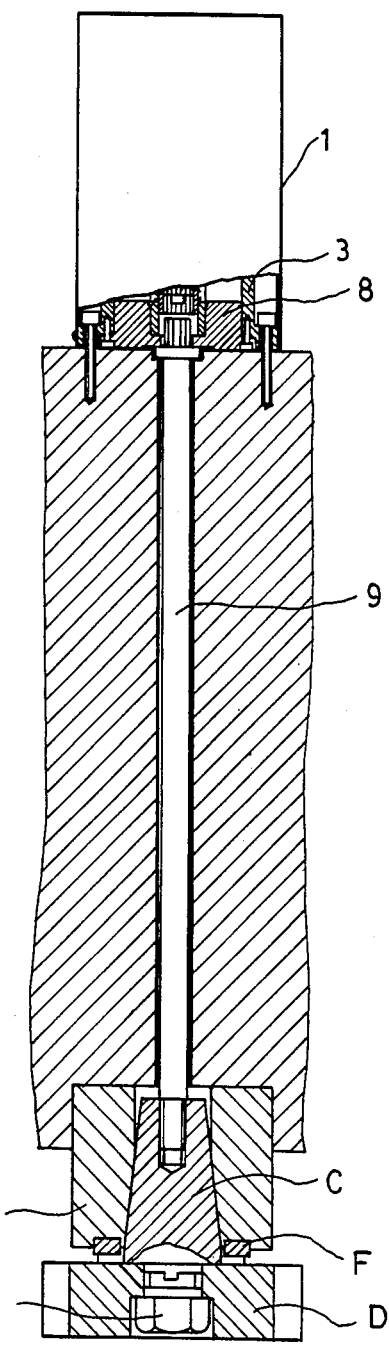
FIG. 4 illustrates a cutter mounted at the device of the present invention.
Figure 5:
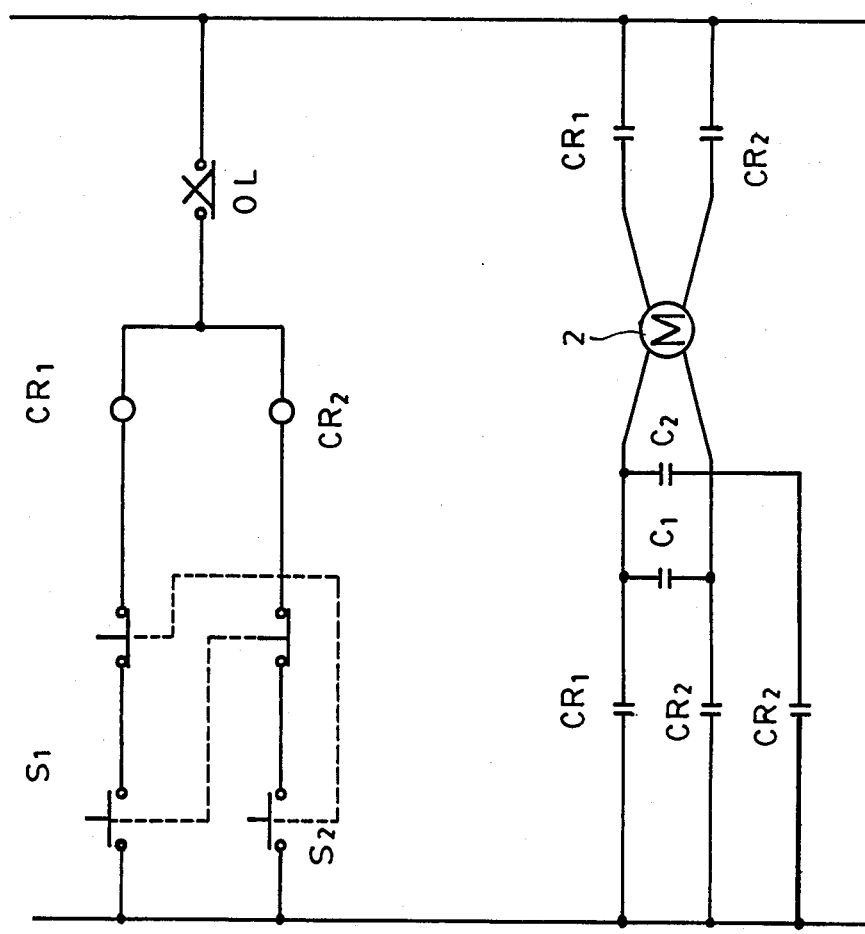
FIG. 5 is a control circuit of the present invention.
Figure 6:
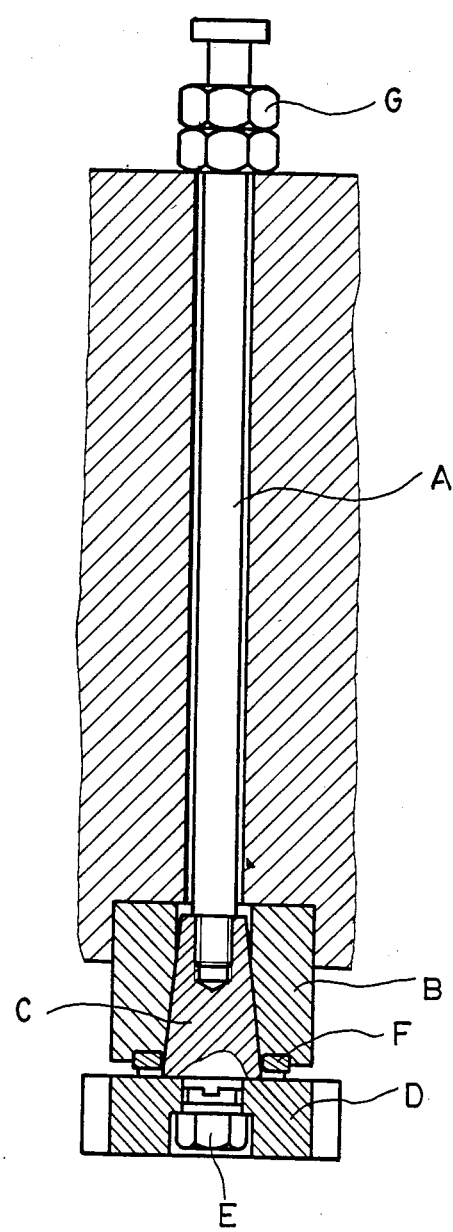
FIG. 6 illustrates a conventional tool-mounting device.

FIG. 5 illustrates the electrical circuit of the present invention. After the forward rotation button S1 is pressed down to lock the tool, the relay CR1 will be turned on, and the capacitor C1 will provide the motor 2 with a starting current to let the motor rotate. When the motor 2 rotates reversely, the tool is to be withdrawn; more power is required to withdraw a tool than to lock a tool. After the reverse rotation button S2 is pressed down to withdraw the tool, the relay CR2 will be turned on; both capacitors C1 and C2 will provide the motor 2 with power simultaneously to start the motor. The capacity of C1 is 5 uf, 400 WAC, while C2 is 10 uf, 400 WAC. To withdraw the tool, more torsional force is required than to lock the tool. After the forward rotation button is turned on as shown in FIG. 2, the motor 2 will rotate clockwise. The rotation speed of the motor will be reduced by the large gear 26, the small gear 25a, and the large gear 42. Simultaneously, the large gear 42 will drive the transmission shaft 4, since the gear portion of the transmission shaft 4 is engaged with the gear tooth groove 73 of the sliding transmission cylinder 7, the cylinder 7 will be driven to rotate. At the same time, the solenoid 6 will attract the attraction cylinder 5 to move downwards to cause the sliding transmission cylinder 7 to compress the spring 72; then, the gear tooth grooves 73 in the sliding transmission cylinder 7 will be engaged with the geared stud 91 on the top of the reach rod 9 as shown in FIG. 3. The reach rod 9 will rotate clockwise to let the thread portion on the lower end of the reach rod as shown in FIG. 4 screw into the upper thread hole on the top of the tool post C so as to have the tool post C fixed together with the driving spindle B.

In operation, the attraction cylinder 5 is attracted, by the solenoid 6, to contact with the top of the bushing 82 in the base 8; the distance moved by the attraction cylinder 5 will cause the gear tooth groove 73 of the sliding transmission cylinder 7 to engage with the geared stud 91 of the reach rod 9. Under normal condition, the sliding transmission cylinder 7 and the reach rod 9 are separated by a distance of 2 mm. The top of the geared stud 91 is furnished with a round edge so as to be engaged smoothly with the reach rod 9 upon the sliding transmission cylinder 7 being moved downwards without damaging the geared stud 91 of the reach rod 9. While mounting the tool, the top of the tool post C is entering into the driving spindle B, and the key hole of the cutter D will first be engaged by the key F. While the reach rod 9 is being rotated, the lower thread portion of the reach rod 9 will be screwed into the screw hole on the top of the tool post C for complete fastening; then, the forward rotation button is released to stop the motor 2, and the solenoid 6 is de-energized to remove the attractive force in the attraction cylinder 5; as a result, the spring 72 will push the sliding transmission cylinder 7 and the attraction cylinder 5 upwards to the original normal position (as shown in FIG. 2). In that case, the reach rod 9 and the tool have been fastened together, being ready for milling operation.

To withdraw the tool, push down the reverse rotation button to let the motor 2 rotate reversely so as to have the sliding transmission cylinder 7 and the reach rod 9 engaged each other and to rotate; the lower thread portion of the reach rod 9 will be disengaged from the tool post C. Since the reach rod 9 neither raises nor moves downwards, it will push the tool post C outwards upon rotating reversely.

Briefly, the tool-replacing device according to the present invention has the following advantages:

1. Upon pushing the buttom switch, the tool can be replaced quickly and simply to save time and manpower, and to increase operation efficiency; it is deemed to be economical.

2. The device can provide a close and tight engagement between the tool and the device parts for operation safety.

3. The serviceable life of the driving spindle and the reach rod would surely be maintained; on the contrary, the aforesaid parts in the conventional device are often knocked about, pulled out, or pushed in before the tool is fixed in place for operation.

Therefore, it is deemed that the automatic tool-replacing device of the present invention can provide a superior mode to replace tools in a milling machine.

I claim:

1. An automatic tool-replacing device for a milling machine, said device comprising:
   (a) a body portion being substantially a round cylinder to cover respective parts of said device, said body portion having a bottom terminus and a top terminus, with the bottom terminus of said body portion being furnished with screw holes so as to be fastened to a respective upper base of said device;

(b) an upper base, said upper base having a first, upper walled portion and a second, lower walled portion, with said upper portion being furnished with screw hole posts for mounting a respective motor base; said upper base having a central round countersunk hole, a hole for a respective motor transmission shaft, and several screw holes for mounting respective mounting discs; said upper base having holes in the lower walled portion for mounting said upper base at a respective milling machine, particularly a lathe and the like; and the lower walled portion of said upper base exteriorly being furnished with screw holes for securing said upper base to said body portion;

(c) a bearing mounted in said countersunk hole of said upper base for guiding the respective transmission shaft;

(d) a motor positioned in the upper portion of said body portion, said motor including a motor transmission shaft and a motor base; and said motor being fixedly mounted on said upper base with said motor base, and said motor transmission shaft being adapted to pass through the hole of said upper base;

(e) an electrical control case fixed to said motor base in coaxial position with said motor;

(f) two mounting discs maintained in spaced relationship from one another by a plurality of screws and sleeves, each one of said mounting discs having a plurality of through holes for mounting a respective reduction gear shaft and a transmission shaft, with one disc being operatively connected to said upper base;

(g) a reduction gear shaft operatively connected with one end at said two mounting discs;

(h) a small gear and a large gear connected to said reduction gear shaft by means of a key;

(i) a transmission shaft operatively connected with one end at said two mounting discs, said transmission shaft having a geared portion;

(j) a large transmission gear connected to said transmission shaft by means of a key; said large transmission gear being adapted to engage with said small gear; and said large gear on said reduction gear shaft being adapted to engage with said motor transmission shaft;

(k) each gear and said transmission shaft being respectively guided by bearing bushings for rotation;

(l) an attraction cylinder having two inner diameters and a top surface, said cylinder being substantially hollow and said top surface being formed with a circular groove for mounting a respective O-shaped ring therein;

(m) an O-shaped ring seated in said circular groove of said attraction cylinder to positively retard friction when in contact with said upper base;

(n) a sliding transmission cylinder having a ring-shaped flange adapted to contact tightly at the inner top portion of said attraction cylinder by means of a respective spring, and the inner surface of said sliding transmission cylinder being provided with gear tooth grooves adapted to engage with the geared portion of said transmission shaft;

(o) a spring to bias said transmission cylinder, said spring surrounding said sliding transmission cylinder;

(p) a solenoid mounted atop of a respective lower base, with said attraction cylinder being operatively disposed within said solenoid;

(q) a lower base with a central through hole for a respective bushing, said lower base being furnished with holes for positively securing said lower base to said upper base; and (r) a bushing operatively mounted in said through hole of said lower base for slidingly receiving therein said transmission cylinder;

for actuation of (s) a reach rod, said reach rod having a geared stud top adapted to engage the gear tooth grooves in the lower end of said sliding transmission cylinder; and the lower end of said reach rod being furnished with a thread portion adapted to engage the respective tool, and wherein the geared stud of said reach rod is mounted in the lower portion of the through hole of said lower base; such that upon forward and reverse actuation of said motor, the rotating power of said motor is respectively transmitted, through said large and small gears for reduction, to said transmission shaft that drives said sliding transmission shaft, and substantially simultaneously said solenoid being operated to attract said attraction cylinder to move downwards to cause said sliding transmission shaft to move down for engaging with the geared stud of said reach rod to rotate together for locking in place the respective tool upon said reach rod rotating forward, and to replace the tool upon said reach rod rotating reversely; and upon said motor being turned of, said solenoid being inoperative, and said spring causing said sliding transmission cylinder to contact said attraction cylinder to restore the normal separation state.

* * * * *